United States Patent
Schmelzle

[11] Patent Number: 5,896,966
[45] Date of Patent: Apr. 27, 1999

[54] HYDRAULIC SEED CLUTCH ACTUATOR FOR SEED DRILLS

[76] Inventor: Douglas Martin Schmelzle, P.O. Box 181, Oneida, Kans. 66522

[21] Appl. No.: 08/850,804

[22] Filed: May 2, 1997

[51] Int. Cl.⁶ .................................................. F16D 25/08
[52] U.S. Cl. ........................................... 192/23; 192/85 C
[58] Field of Search ..................... 192/23, 85 C, 192/86, 89.21, 93 A; 111/37, 177; 222/616

[56] References Cited

U.S. PATENT DOCUMENTS

| | | | |
|---|---|---|---|
| 2,561,235 | 7/1951 | Schmutzler | 192/89.21 |
| 2,881,883 | 4/1959 | Schnell | 192/23 |
| 3,106,998 | 10/1963 | Walker | 192/23 |
| 4,889,217 | 12/1989 | Janiszewski et al. | 192/85 C X |

*Primary Examiner*—Richard M. Lorence
*Attorney, Agent, or Firm*—Litman, McMahon & Brown, L.L.C.

[57] ABSTRACT

A seed clutch actuating hydraulic piston & cylinder unit for a seed drill is attached directly to a cam plate on the seed clutch. The clutch actuating piston & cylinder unit is linked to a hydraulic lifting system for the seed drill such that, when a tractor operator operates the hydraulic lift for the seed drill, the clutch actuating piston & cylinder unit is retracted (or extended), with the piston then immediately rotating the seed clutch cam plate, which disengages the seed clutch. The seed clutch thus disengages the seed metering drive shaft so that seed metering is immediately shut off as the seed drill starts to raise. As the operator lowers the seed drill back down to an operating position, the clutch actuating piston and cylinder unit is extended to rotate the seed clutch cam plate back to its original position, which engages the clutch to reconnect operative power to the seed metering shaft. An optional time delay can be inserted into the extension side of the hydraulic controls to allow a timed delay in clutch actuation.

5 Claims, 5 Drawing Sheets

HYDRAULIC SEED CLUTCH ACTUATOR FOR SEED DRILLS

BACKGROUND OF THE INVENTION

1. Field of the Invention

The present invention relates generally to a hydraulic seed clutch actuator for seed drills of the type used to plant seeds in agricultural operations. The term "seed drill" is intended herein to encompass various types of seed planters including traditional seed drills, row planters and other similar devices. More particularly, the invention relates to such a hydraulic seed clutch actuator which is linked to an OEM hydraulic lifting system on the seed drill. The inventive hydraulic actuator assures that, when an operator, typically a person driving a tractor towing the seed drill, operates a hydraulic control to lift the seed drill, as at the end of a planted row, the seed clutch is simultaneously operated to immediately cut off seed metering.

2. Description of the Related Art

A variety of seed drills are typically used in modern large scale agricultural crop planting operations. A typical seed drill includes a frame upon which one or more seed hoppers are positioned. The seed hopper(s) have a plurality of seed discharge openings, each of which feeds into a respective seed metering devices. The seed metering devices are typically linked via a common drive shaft which is powered from a linkage connected to ground engaging wheels on the seed drill. Seed metering rate is thus proportional to the ground speed of the seed drill. One or more seeds from the metering mechanisms are dropped into respective seed tubes with each few inches of travel, which dropped seeds are fed through the seed tubes and dropped into a furrow opened by a single or pair of furrowing discs. A tamping wheel and/or a closing wheel typically follow the disc(s) and the seed tube to tamp the seed into the furrow and then to close the furrow, respectively.

Considerable research goes into the development of improved strains of crops, many of which are patented by research institutions and seed companies. Many of these improved crops exhibit a variety of improved characteristics, including increased yield and greater resistance to pests and disease. However, the costs of these improved seeds is also considerably higher than that of conventional seed. Farmers are thus faced with tough decisions on whether to risk the extra cost for improved seed as a trade-off for the expectation or hope for better crop yields. As seed prices continue to escalate, the importance of conserving seed becomes ever more important.

In a conventional seed drill with which the present invention is concerned, a farmer will typically operate a hydraulically driven rocker arm which pivots to raise and lower the furrowing discs as the tractor and seed drill reach the end of each series of planted rows and resume the next series of rows, respectively. A mechanically operated seed clutch is attached to a linkage which links the seed clutch to the rocker arm. As the rocker arm pivots to lift the seed drill, the connected linkage disengages the seed clutch to isolate the seed metering drive shaft from a drive shaft driven by ground engaging wheels on the seed drill. The seed clutch is thus responsive to the raising of the seed drill to shut off power to the seed metering shaft, and to thus stop dispensing seed after the drill is lifted. The tractor and towed seed drill are then turned 180 degrees and the seed drill is lowered to start another series of planted rows.

A problem with this approach to actuating a seed clutch is an inherent delay in operation of the seed clutch due to the linkage operation. Typically, the seed clutch is not disengaged until the seed drill is near the fully raised position, and is reengaged as the seed drill is starting to lower. This means that seed continues to be metered out and dropped through the seed tubes as the drill is being lifted, and then again as the seed drill is being lowered. Depending upon the travel speed of the tractor, seed can be dropped on the ground for as long as six feet or more each time the seed drill is raised and lowered. Taking an average 40 acre field to be planted, and assuming a square shape and a seed drill width of 15 feet, a tractor would make 88 passes across the field during planting. With each pass, seed is dispensed past the planted row for an average distance of 6 feet, and ahead of the next row series for an additional 6 feet. Multiplying 12 feet times 88 passes means that 1056 feet of seed can be wasted in that field. Of course, if the field is irregularly shaped or includes terraces, the seed drill will need to be raised more often, which can increase the seed wastage. The problem of wasted seed is particularly costly in soy bean or corn plantings, but is a problem no matter what crop is being planted.

It is clear, then, that a need exists for an apparatus which quickly and positively shuts off and resumes seed metering in a seed drill under the control of an operator. Such an apparatus should be a convenient and economical retrofit for existing seed drills, and should be readily operable from existing tractor hydraulics and controls.

SUMMARY OF THE INVENTION

A conventional seed drill includes a hopper which feeds seeds to a plurality of seed metering devices arrayed along its width. All of the seed metering devices are driven by a common shaft to meter seeds from the hopper into a respective plurality of seed tubes which drop seeds into a like plurality of furrowing discs. The common seed metering drive shaft is linked to a drive shaft connected to one side of a mechanical seed clutch. The opposite side of the seed clutch is linked to a second drive shaft which is driven by a chain and sprocket drive linked to ground engaging wheels on the seed drill. The invention includes a hydraulic clutch actuating piston & cylinder unit attached to the seed drill hopper with a clevis attaching the piston to a rotating cam plate on the seed clutch. The clutch actuating piston & cylinder unit is linked to a hydraulic lifting system for the seed drill such that, when a tractor operator operates the hydraulic lift for the seed drill, the clutch actuating piston & cylinder unit is extended, with the piston then immediately rotating the seed clutch cam plate, which disengages the seed clutch. The seed clutch thus disengages the seed metering drive shaft so that seed metering is immediately shut off as the seed drill starts to raise, as at the end of a series of rows in a planted field. Once the tractor and seed drill have turned 180 degrees and the operator lowers the seed drill back down to an operating position, the clutch actuating piston and cylinder unit is extended to rotate the seed clutch cam plate back to its original position, which engages the clutch to reconnect operative power to the seed metering shaft. An optional time delay can be inserted into the extension side of the hydraulic controls to allow a timed delay in clutch actuation. This prevents seed from being dispensed until the seed drill is lowered back to an operative position with the furrowers penetrating the soil. The inventive hydraulic seed clutch actuator can be readily retrofit to existing seed drills as a replacement for typical mechanical linkages linked to the seed drill lifting rocker arm.

OBJECTS AND ADVANTAGES OF THE PRESENT INVENTION

The objects and advantages of the present invention include: providing a hydraulic seed clutch actuator for a seed drill; providing such a seed clutch actuator which positively and immediately shuts off seed metering when the seed drill is lifted; providing such a seed clutch actuator which is tied to a hydraulic lifting mechanism for the seed drill; providing such a seed clutch actuator which minimizes or eliminates seed wastage during transitions between rows of a planted field; providing such a hydraulic actuator which can be easily retrofit to existing seed drills; providing such a seed clutch actuator which is efficient and economical to manufacture and install and which does not add significantly to the maintenance requirements of the seed drill; and providing such a seed clutch actuator which is efficient and convenient in operation, capable of a long operating life and which is particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE PREFERRED EMBODIMENTS

Figure 1:
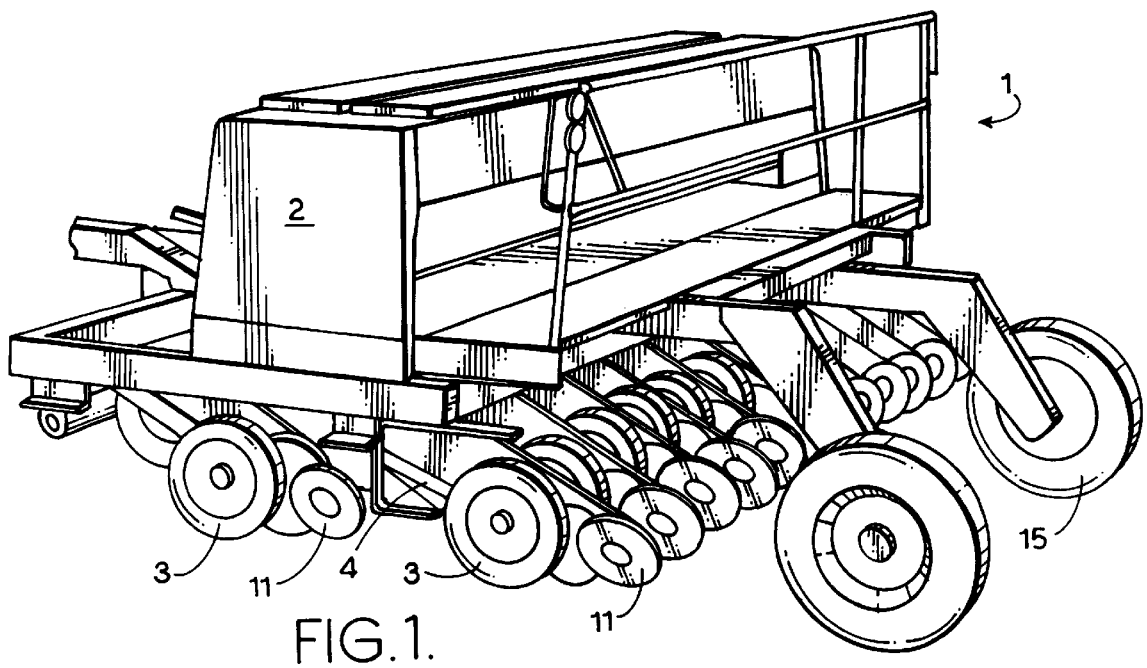
FIG. 1 is a perspective view of a seed drill with a pair of trailing, ground engaging wheels and a hopper feeding seed to two rows of furrower/seeders.

As required, detailed embodiments of the present invention are disclosed herein; however, it is to be understood that the disclosed embodiments are merely exemplary of the invention, which may be embodied in various forms. Therefore, specific structural and functions details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience and reference only and will not be limiting. For example, the words "up", "down", "right" and "left" will refer to directions in the drawings to which reference is made. The words "in" and "out" will refer to directions toward and away from, respectively, the geometric center of the structure being referred to. Said terminology will include the words specifically mentioned derivatives thereof and words of similar import.

Figure 2:
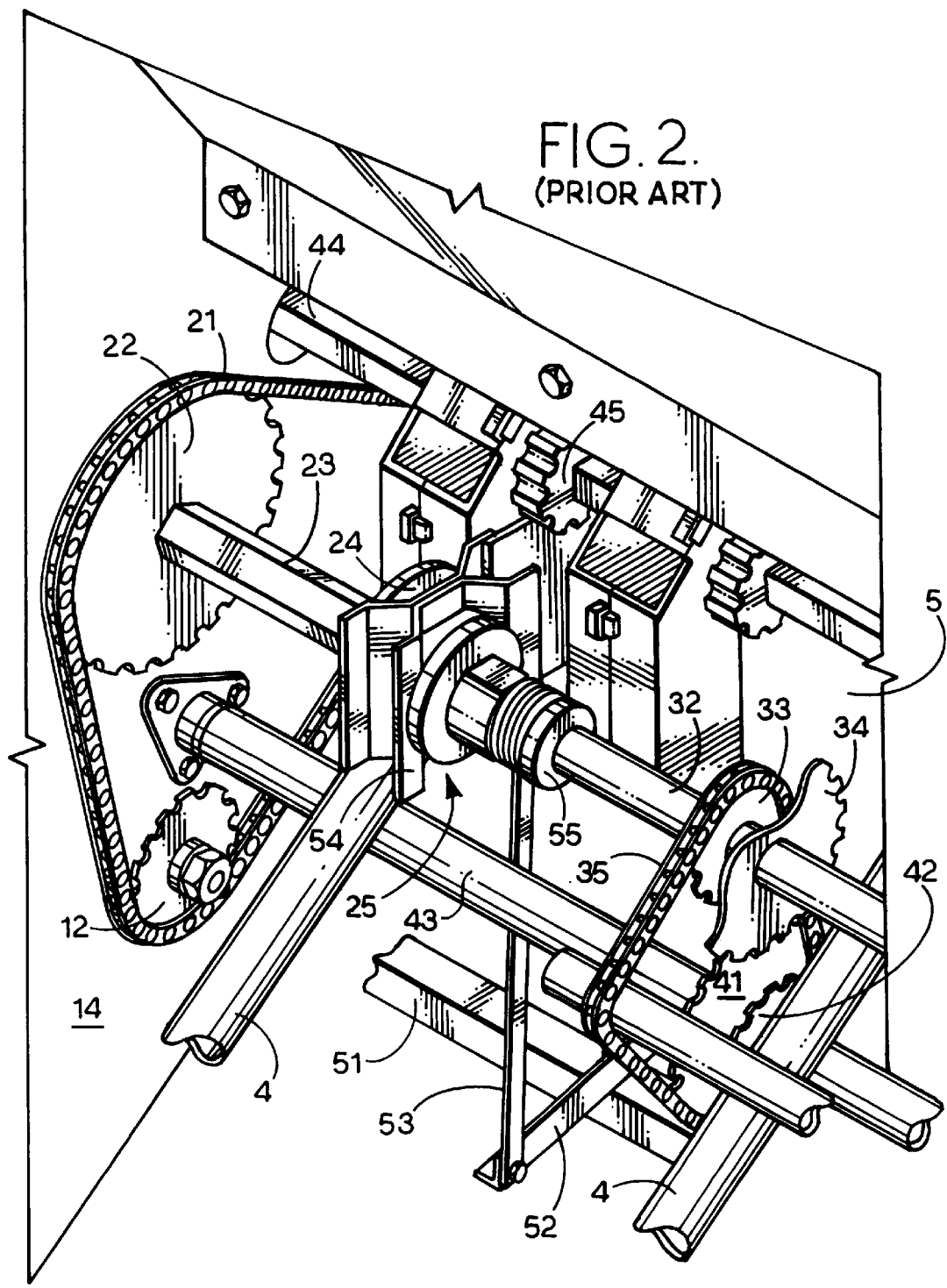
FIG. 2 is a greatly enlarged, fragmentary, perspective view of a portion of the seed drill of FIG. 1, showing a seed metering system including a seed clutch with a prior art mechanical clutch actuator.

Referring to the drawings in more detail, reference numeral 1 in FIG. 1 generally designates a conventional seed drill of the type model 750 No Till Seed Drill manufactured by John Deere. The seed drill 1 includes a large seed hopper 2 extending across the width thereof with the hopper 2 supplying seed to a double row of furrower/seeders 3 via seed tubes 4 as fed by a seed metering system, generally indicated at 5 (FIG. 2). Positioned behind each furrowing disc 3 is a tamping wheel 11 which covers the seed furrow.

FIG. 2 illustrates a frontal view of a portion of the seed drill 1 and the seed metering system 5. The metering system 5 includes a ground speed sensing gear 12 positioned on an inside wall of a side well 14. The gear 12 is driven by one of a chain (not shown) positioned within the side well 14 which chain is driven by one of a pair of ground engaging wheels 15 (FIG. 1) via a linkage (also not shown). The gear 12 is thus rotated at a speed proportional to the ground speed of the seed drill 1. A drive chain 21 connects the gear 12 to a gear 22 which gear 22, in turn, is attached to a drive shaft 23. The drive shaft 23 connects to a first side 24 of a mechanical seed clutch 25. The opposite side 31 of the seed clutch 25 is linked to a second drive shaft 32, with a pair of sprockets 33 and 34 connected thereto. A chain 35 is selectively attached between one of the sprockets 33 or 34, depending upon desired speed of seed metering, and a respective one of a second pair of sprockets 41 and 42. The sprockets 41 and 42 are attached to a drive shaft 43, which extends into the side well 14 and drives a linkage (not shown) which linkage, in turn, drives a seed metering shaft 44. The seed metering shaft 44 drives a plurality of seed metering wheels 45, each of which dispenses seed to a respective one of the seed tubes 4 to thereby supply seeds to corresponding ones of the furrower/seeders 3 at a rate dependent upon the ground speed of the seed drill 1 and the selected pair of sprockets 33, 34 and 41, 42 driven by the chain 35. In the prior art OEM equipment illustrated in FIG. 2, a rocker arm 51 is hydraulically driven to selectively raise and lower the seed drill 1. An angle member 52 is attached to the rocker arm 51 and a linkage arm 53 has one end attached to the angle member 52 and an opposite end attached to a seed clutch cam plate 54. The seed clutch cam plate 54, when rotated about the shaft 32, pushes the opposite side 31 of the seed clutch against the action of a clutch spring 55, thus disengaging the seed clutch 25. Thus, when the rocker arm 51 is pivoted to raise the seed drill 1, the linkage arm 53 pushes upward against the clutch cam plate 54, thus rotating it counterclockwise against stationary cam plate 60 (as viewed from right to left in FIG. 2), thus disengaging clutch teeth 61 on the seed clutch opposite side 31 from clutch teeth 62 on the first side 24 of the seed clutch 25, which action disengages the seed clutch 25 and stops the transmission of power to the seed metering shaft 44. Conversely, when the rocker arm 51 is pivoted to lower the seed drill 1, the linkage arm 53 pulls downward against the clutch cam plate 54, thus rotating it clockwise (again as viewed from right to left in FIG. 2), thus reengaging clutch teeth 61 on the seed clutch opposite side 31 from clutch teeth 62 on the first side 24 of the seed clutch 25, which action engages the seed clutch 25 and resumes the transmission of power to the seed metering shaft 44.

As mentioned above, a problem with the OEM mechanical seed clutch actuator (i.e. the linkage arm 53 operated by the rocker arm 51), is the built-in time delay between the time an operator engages tractor hydraulic controls (not shown) to start raising the seed drill 1, and the time the rocker arm 51 actually pivots to a degree required to push the linkage arm upward to the point at which it disengages the seed clutch 25. Average travel of the seed drill 1 between these two events is about six feet, thus wasting considerable seed which is just dropped on the ground. Similarly, as the operator engages the tractor hydraulic controls to lower the seed drill 1 by pivoting the rocker arm 51, the seed clutch 25 is reengaged by the linkage arm 53 before the seed drill 1 is fully lowered to operating position, again wasting a quantity of seed equal to about six feet of seed drill travel. It is this wastage of seed which the current invention is designed to address.

Figure 3:
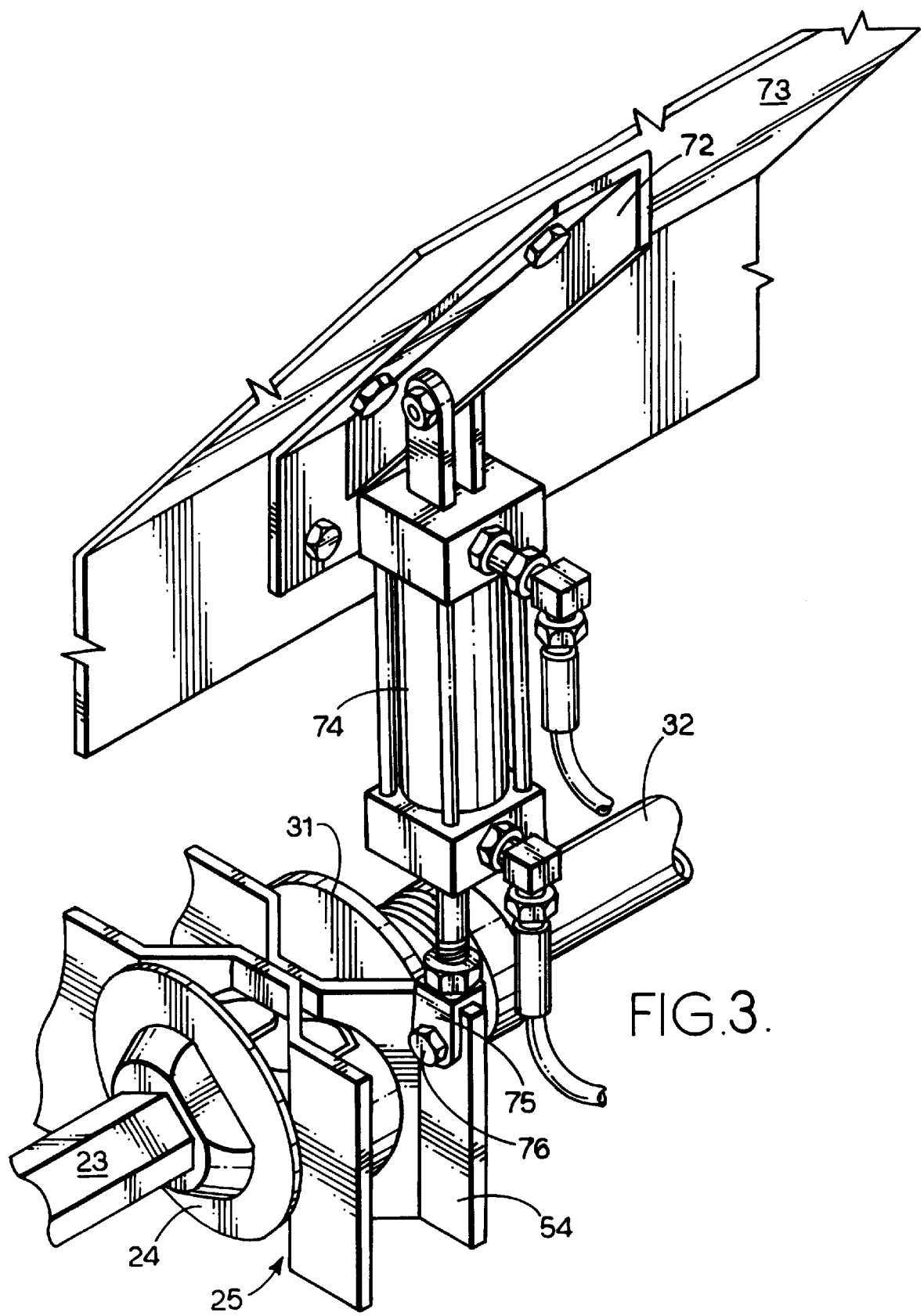
FIG. 3 is a greatly enlarged, fragmentary, perspective view of a portion of the seed drill of FIG. 1, showing portions of a seed metering system and incorporating a seed clutch with the inventive hydraulic seed clutch actuator.
Figure 4:
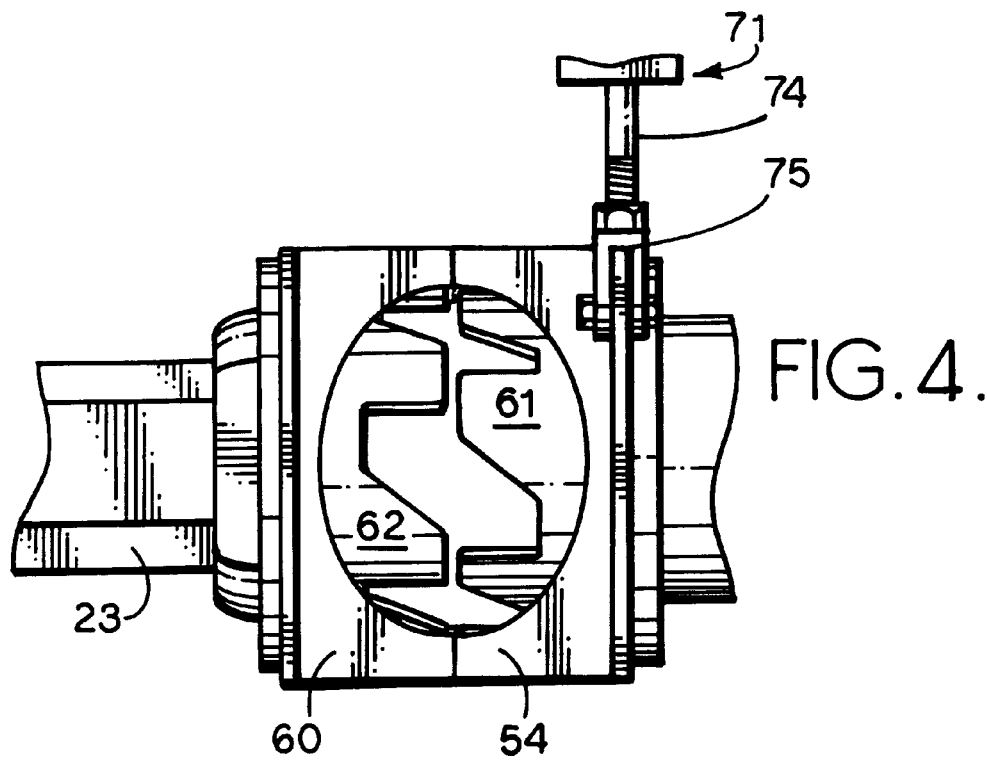
FIGS. 4 and 4a are greatly enlarged, fragmentary, front elevations of the seed clutch of FIG. 3, with FIG. 4 showing the clutch in a disengaged condition and with FIG. 4a showing the clutch in an engaged condition.
Figure 4A:
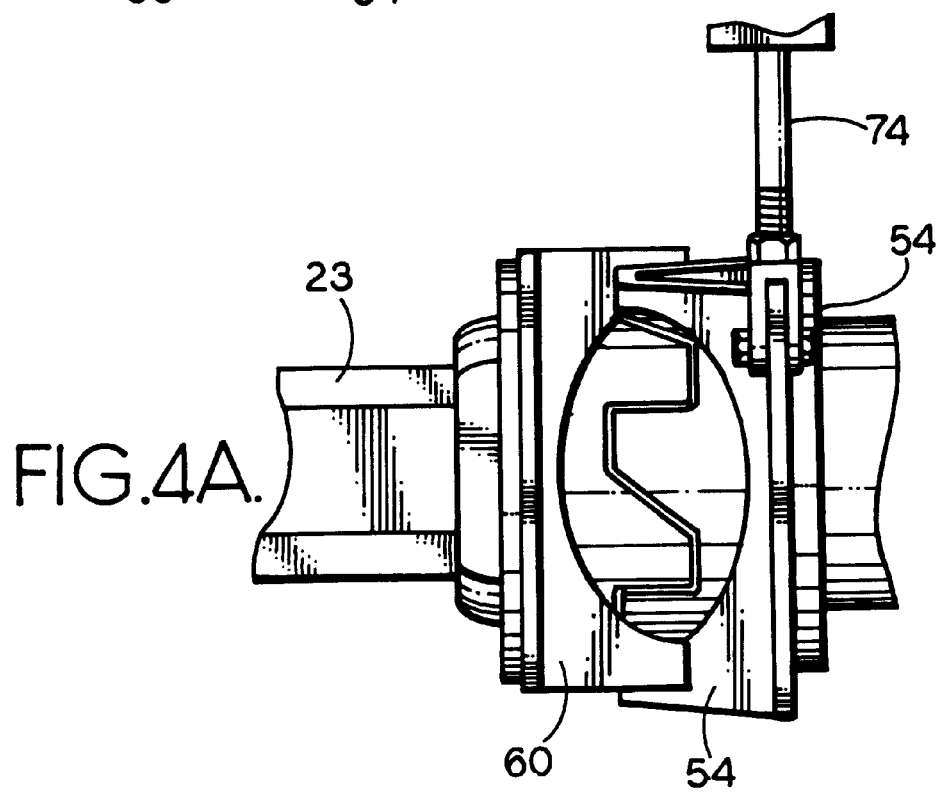

Referring to FIGS. 3, 4 and 4a, the inventive hydraulic seed clutch actuator, generally indicated at 71, is shown installed on the OEM seed metering system 5. In order to install the hydraulic seed clutch actuator 71, the linkage arm 53, and, optionally, the angle member 52, is removed from the seed drill 1 and the seed clutch cam plate 54 is pivoted 180 degrees about the drive shaft 32. Several elements in the seed metering system 5 have been omitted from FIG. 3 to allow better illustration of the invention. An angle member 72 is attached to a bottom side 73 of the seed hopper 2 and a clutch actuating piston and cylinder unit 74 has the cylinder portion pivotally attached to the angle member 72. A terminal end of the piston portion of the piston and cylinder unit 74 is attached to a clevis 75, which clevis 75 is attached to the seed clutch cam plate 54 via bolt 76 in the same aperture, to which the OEM linkage arm 53 was previously attached. Extension of the piston and cylinder unit 74 rotates the cam plate 54 counter-clockwise, thus changing the seed clutch 25 from the engaged position, as shown in FIG. 4, to the disengaged position, as shown in FIG. 4a. Retraction of the piston and cylinder unit 74, conversely, changes the seed clutch 25 from the disengaged position of FIG. 4a to the engaged position of FIG. 4.

Figure 5:
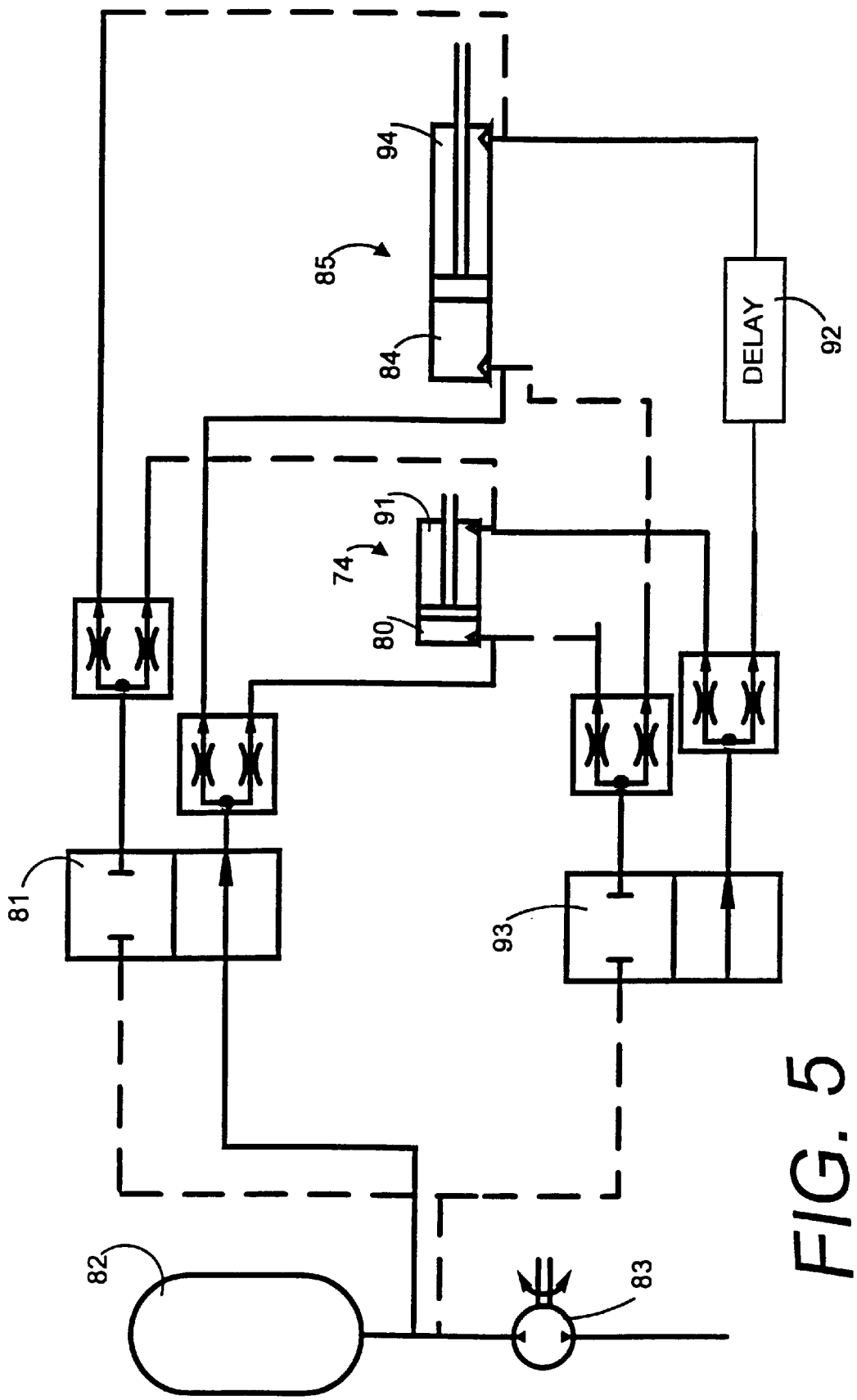
FIG. 5 is a schematic diagram of a hydraulic system for the seed drill, modified for controlling the inventive seed clutch actuator.

In a modified hydraulic system illustrated schematically in FIG. 5, a first (extension) end 80 of the clutch actuating piston and cylinder unit 74 is directly linked to a valve 81 selectively supplying pressurized fluid from an accumulator 82 and a pump 83 to an extension input 84 of a double action hydraulic piston and cylinder unit 85 which selectively operates the rocker arm 51 to raise the seed drill 1. A second (retraction) end 91 of the piston and cylinder unit 74 is indirectly linked via a variable delay unit 92 to a valve 93 selectively supplying pressurized fluid to an retraction input 94 of the double action hydraulic piston and cylinder unit 85 which selectively operates the rocker arm 51 to lower the seed drill 1. Since the clutch actuating piston and cylinder unit 74 includes a short throw piston, disengagement of the seed clutch 25 occurs almost instantaneously as soon as pressurized fluid is supplied thereto via the valve 81. Similarly, after the delay created by the delay unit 92, reengagement of the seed clutch 25 is again virtually instantaneous as soon as pressurized fluid is supplied thereto via the valve 93. Seed loss, then, is virtually eliminated as the seed drill 1 is raised and lowered during transitions from row to row.

It should be noted that, although the actuating piston and cylinder unit 74 is illustrated as being attached to the bottom of the seed hopper 2, it can be positioned anywhere near and at any angle relative to the seed clutch 25, with orientation of the cam plate 54 changed accordingly. With the orientation illustrated herein, the piston and cylinder unit 74 is extended to disengage the seed clutch 25 and retracted to engage the seed clutch 25, however, a reverse orientation is possible depending upon placement of the piston and cylinder unit 74. While the delay unit 92 has been shown in the hydraulic system, a time delay can be provided electronically if a dedicated valve were provided for the clutch actuating piston and cylinder 74. While the invention has been illustrated and describe with relation to a John Deere model 750 seed drill, the basic principle is applicable with any seed drill with a mechanically actuated seed clutch or switch.

It is thus to be understood that while certain forms of the present invention have been illustrated and described herein, it is not to be limited to the specific forms or arrangement of parts described and shown.

What is claimed and desired to be secured by Letters Patent is as follows:

1. A hydraulic actuator for a seed clutch in a seed drill, the seed drill including a hydraulically actuated raising and lowering system linked to a first valve for selectively supplying pressurized fluid to a hydraulic seed drill raising piston and cylinder unit to raise the seed drill and a second valve which selectively supplies pressurized fluid to the hydraulic seed drill raising piston and cylinder unit to lower the seed drill and including a seed metering shaft selectively driven by a seed clutch, when engaged, the seed clutch including a cam plate movable between a first position in which the seed clutch is engaged and a second position in which the seed clutch is disengaged, the hydraulic actuator comprising:

a) a hydraulic seed clutch actuating piston and cylinder unit which is separate from the hydraulic seed drill raising piston and cylinder unit, said clutch actuating hydraulic piston and cylinder unit including a first end attachable to the seed drill and a second end attachable to the cam plate such that, when so attached, extension and/or retraction of said clutch actuating piston and cylinder unit selectively moves the cam plate between the first and second positions.

2. A hydraulic actuator as in claim 1, wherein said hydraulic seed clutch actuating piston and cylinder unit includes a double action cylinder with a first input adapted for connection to said first valve and a second input adapted for connection to said second valve.

3. A hydraulic actuator as in claim 2, wherein said hydraulic seed clutch actuating piston and cylinder second input is connected to a delay unit which is, in turn, connectable to said second valve.

4. A hydraulic actuator for a seed clutch in a seed drill, the seed drill including a hydraulically actuated raising and lowering system linked to a first valve for selectively supplying pressurized fluid to a hydraulic seed drill raising piston and cylinder unit to raise the seed drill and a second valve which selectively supplies pressurized fluid to the hydraulic seed drill raising piston and cylinder unit to lower the seed drill and including a seed metering shaft selectively driven by a seed clutch, when engaged, the seed clutch including a cam plate movable between a first position in which the seed clutch is engaged and a second position in which the seed clutch is disengaged, comprising:

a) a hydraulic seed clutch actuating piston and cylinder unit which is separate from the hydraulic seed drill raising piston and cylinder unit, said clutch actuating hydraulic piston and cylinder unit including a double action cylinder with a first input connected to said first valve and a second input connected to said second valve, said clutch actuating piston and cylinder unit including a first end attachable to the seed drill and a second end attachable to the cam plate such that extension and/or retraction of said clutch actuating piston and cylinder unit selectively moves the cam plate between the first and second positions;

b) a first fluid supply line adapted to connect said first input to said first valve; and c) a second fluid supply line adapted to connect said second input to said second valve.

5. A hydraulic actuator as in claim 4, and further comprising:

a) a delay unit which is connectable between said second valve and said second input.

\* \* \* \* \*